United States Patent
Nogi et al.

(10) Patent No.: US 7,378,453 B2
(45) Date of Patent: May 27, 2008

(54) SURFACE CROSSLINKING TREATMENT METHOD OF WATER-ABSORBING RESIN POWDER

(75) Inventors: Kozo Nogi, Kakogawa (JP); Shigeru Sakamoto, Himeji (JP); Noriaki Mizutani, Himeji (JP); Yorimichi Dairoku, Himeji (JP); Kunihiko Ishizaki, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 185 days.

(21) Appl. No.: 10/798,346

(22) Filed: Mar. 12, 2004

(65) Prior Publication Data

US 2004/0181031 A1    Sep. 16, 2004

(30) Foreign Application Priority Data

Mar. 14, 2003    (JP)    ............... P. 2003-070188

(51) Int. Cl.
*C08J 3/00* (2006.01)
*C08J 3/12* (2006.01)

(52) U.S. Cl. .................. 521/53; 521/56; 521/149; 521/150; 523/340; 528/481; 528/494; 528/495; 528/499

(58) Field of Classification Search .............. 521/53, 521/56, 149, 150; 523/340; 528/481, 494, 528/495, 499
See application file for complete search history.

(56) References Cited

U.S. PATENT DOCUMENTS

| | | | |
|---|---|---|---|
| 4,093,776 A | | 6/1978 | Aoki et al. |
| 4,295,281 A | * | 10/1981 | Potter ..................... 34/371 |
| 4,367,323 A | | 1/1983 | Kitamura et al. |
| 4,446,261 A | | 5/1984 | Yamasaki et al. |
| 4,625,001 A | | 11/1986 | Tsubakimoto et al. |
| 4,683,274 A | | 7/1987 | Nakamura et al. |
| 4,734,478 A | | 3/1988 | Tsubakimoto et al. |
| 4,769,427 A | | 9/1988 | Nowakowsky et al. |
| 4,873,299 A | | 10/1989 | Nowakowsky et al. |
| 4,985,514 A | | 1/1991 | Kimura et al. |
| 5,124,416 A | | 6/1992 | Haruna et al. |
| 5,149,334 A | * | 9/1992 | Lahrman et al. ............ 604/367 |
| 5,149,750 A | | 9/1992 | Niessner et al. |
| 5,244,735 A | | 9/1993 | Kimura et al. |
| 5,250,640 A | | 10/1993 | Irie et al. |
| 5,369,148 A | | 11/1994 | Takahashi et al. |
| 5,397,626 A | * | 3/1995 | Berg et al. ................ 442/393 |
| 5,610,220 A | | 3/1997 | Klimmek et al. |
| 5,672,633 A | * | 9/1997 | Brehm et al. ................ 521/53 |
| 6,323,252 B1 | | 11/2001 | Gartner et al. |
| 6,414,214 B1 | | 7/2002 | Engelhardt et al. |
| 6,576,713 B2 | | 6/2003 | Ishizaki et al. |
| 6,620,889 B1 | | 9/2003 | Mertens et al. |

FOREIGN PATENT DOCUMENTS

| | | |
|---|---|---|
| CN | 1342180 A | 3/2002 |
| EP | 0 509 708 A1 | 10/1992 |
| EP | 1 191 051 A2 | 3/2002 |
| EP | 1 178 059 A2 | 6/2002 |
| JP | 762073 B2 | 7/1995 |
| JP | 8-508517 A | 9/1996 |
| JP | 9-502221 A | 3/1997 |
| JP | 2966539 B2 | 8/1999 |
| JP | 2001-232734 A | 7/2001 |
| JP | 2001-523287 A | 11/2001 |
| JP | 2002-121291 A | 4/2002 |
| JP | 2002-212204 A | 7/2002 |
| WO | WO 94/15651 A1 | 7/1994 |
| WO | WO 95/09014 A1 | 4/1995 |
| WO | WO 95/22356 A1 | 8/1995 |
| WO | WO 98/49221 A1 | 11/1998 |
| WO | WO 00/53664 A1 | 9/2000 |
| WO | WO 01/25290 A1 | 4/2001 |
| WO | WO 01/38402 A1 | 5/2001 |

OTHER PUBLICATIONS

European Search Report dated Aug. 16, 2004.

* cited by examiner

*Primary Examiner*—Irina S Zemel
(74) *Attorney, Agent, or Firm*—Sughrue Mion, PLLC (57) ABSTRACT

A surface crosslinking treatment method of a water-absorbing resin powder is disclosed that can overcome various problems in production encountered in the production of surface crosslinked water-absorbing resin powders on an industrial scale and can produce a water-absorbing resin powder having excellent physical properties without causing deterioration in physical properties of resin. The surface crosslinking treatment method of a water-absorbing resin powder includes adding a surface crosslinking agent to a water-absorbing resin powder and heat treating the mixture, wherein (1) the water-absorbing resin powder after the heat treatment is stirred and cooled under an air flow; (2) the water-absorbing resin powder after the heat treatment is cooled under an air flow, and at the same time, at least a part of fine particles of the water-absorbing resin powder and/or the residual crosslinking agent is removed by the air flow; or (3) the water-absorbing resin powder after the heat treatment is cooled and simultaneously granulated, and preferably an aqueous solution is added to the water-absorbing resin powder at a temperature of 40-100° C. during the cooling treatment.

25 Claims, 1 Drawing Sheet

SURFACE CROSSLINKING TREATMENT METHOD OF WATER-ABSORBING RESIN POWDER

FIELD OF THE PRESENT INVENTION

The present invention relates to a surface crosslinking treatment method of a water-absorbing resin powder.

DESCRIPTION OF THE RELATED ART

In recent years, for the purpose of absorbing a large quantity of water, water-absorbing resins are broadly applied as one of materials constituting medical supplies such as paper diapers, sanitary napkins or incontinence pads. Further, besides the medical supplies, water-absorbing resins are applied over a broad range for the purpose of water absorption or water holding as a soil water holding agent and a drip sheet of foodstuffs, and the like. As the water-absorbing resins, for example, polyacrylic acid partially neutralized crosslinked products, hydrolyzates of a starch-acrylonitrile copolymer, neutralized materials of a starch-acrylic acid graft polymer, saponified materials of a vinyl acetate-acrylic acid ester copolymer, hydrolyzates of an acrylonitrile copolymer or acrylamide copolymer or crosslinked products thereof, carboxymethyl cellulose crosslinked products, crosslinked products of a 2-acrylamide-2-methylpropanesulfonic acid (AMPS) copolymer, crosslinked products of polyethylene oxide, crosslinked products of polyacrylamide, crosslinked products of polyethyleneimine, and the like are known. Most of these materials are used in the powdered state.

With respect to the production process of these water-absorbing resin powders, a method in which an aqueous gel crosslinked polymer obtained by polymerizing a monomer aqueous solution containing a crosslinking agent is dried and, if necessary, further pulverized, is the main current. However, in aqueous gel crosslinked polymers as the water-absorbing resin, drying or pulverization in the high-temperature state immediately after drying is very difficult because of their high water absorption power, tackiness or adhesion and low heat resistance, and therefore, their productivity was low, and physical properties and energy efficiency of the resulting water-absorbing resins were very poor. Accordingly, the production process of water-absorbing resin powders has been investigated from various points as in JP-A-2002-121291 and U.S. Pat. No. 6,576,713.

Water-absorbing resins are slightly crosslinked a hydrophilic polymer (usually crosslinked during polymerization), whereby they are imparted a water-insoluble and water-swelling function, and are usually produced as a powder. However, in recent years, since higher functions are demanded, a gradient in crosslinking density between the inside and the surface is imparted by surface crosslinking (secondary crosslinking) of the powder after polymerization in addition to crosslinking inside the powder, whereby water-absorbing resins are improved in water absorption speed, liquid permeability and absorption magnification under pressure.

For example, JP-A-2002-121291 and U.S. Pat. No. 6,576,713 describe that a water-absorbing resin powder obtained through steps including polymerization of a monomer, heat drying, cooling, and pulverization is subjected to surface crosslinking by further adding an aqueous solution containing a surface crosslinking agent, etc., heating and drying.

Although JP-A-2002-121291 and U.S. Pat. No. 6,576,713 describe a production process of a water-absorbing resin powder and also mention surface crosslinking of the water-absorbing resin powder, any attention was not paid to cooling treatment after the heat treatment for the purpose of surface crosslinking.

If necessary, cooling may be conducted after heat treatment for surface crosslinking. Cooling treatment method in such a case is cooling by a fluidized bed or low-temperature screw conveyor as described in JP-T-8-508517 (the term "JP-T" as used herein means a published Japanese translation of a PCT patent application), U.S. Pat. No. 5,610,222, JP-T-9-502221 and U.S. Pat. No. 5,672,633.

On the other hand, with respect to the addition of an aqueous solution after the heat treatment, JP-T-2001-523287 and U.S. Pat. No. 6,323,252 describe that by adding an additive aqueous solution to an aqueous fluid-absorbing polymer after heat treatment to again humidify it, accumulation of electrification, generation of dusts, and coagulation of polymer particles are prevented. WO 01/25290A and U.S. Pat. No. 6,414,214 describe the addition of water after heat treatment in production of hydrogel-forming polymers.

U.S. Pat. No. 4,734,478, JP-B-62073 and U.S. Pat. No. 5,369,148 describe that fine powders are agglomerated by the addition of an aqueous solution. The addition of an aqueous solution to those water-absorbing resins generally involved heat generation (self-heating), not endothermic reaction, due to hydrated heat between water-absorbing resin and water.

In the technologies disclosed in the above-described patent documents, water-absorbing resins having high physical properties are obtained according to surface crosslinking at a laboratory level, batchwise surface crosslinking, or surface crosslinking in the small-scale production of at most about several tens kilograms per hour. However, in the case of production on an industrial scale, it was found that improvements in physical properties by the surface crosslinking are not sufficiently exhibited.

As a result of investigations on the cause of physical property decrease in an industrial scale in such conventional surface crosslinking step, the present inventors found that the source was due to problems of condensation of moisture generated with the progress of surface crosslinking reaction, production troubles due to coagulation of resin particles caused thereby, and deterioration in physical properties of resin, and then made extensive and intensive investigations to overcome these problems as well as problems such as incorporation of resin fine powders and dust generation in such step.

Further, in order to render a water-absorbing resin powder obtained after the surface crosslinking step in a mode wherein it can be finally used, there is the case where an agglomeration step is necessary. The present inventors also made investigation on this step.

SUMMARY OF THE PRESENT INVENTION

The present invention is to overcome various problems in production encountered in the production of surface crosslinked water-absorbing resin powders on an industrial scale (such as non-reproduction of physical properties in small scale), and to provide a surface crosslinking treatment method of a water-absorbing resin powder having excellent physical properties without causing deterioration in physical properties of resin.

More specifically, the present invention is to provide a method of surface crosslinking treatment method of a water-absorbing resin powder in the production of water-absorbing resin powder, which is applicable even on an industrial scale, wherein reaction of a surface crosslinking agent is controlled, condensation of moisture generated by surface crosslinking reaction or the like, and coagulation of resin particles caused thereby are prevented, the production is made stable, and deterioration in physical properties of resin is prevented, that are found by the present inventors.

Further, the present invention is to provide a method of surface crosslinking treatment method of a water-absorbing resin powder in the production of water-absorbing resin powder, which is applicable even on an industrial scale, wherein the amount of generated resin fine particles is reduced, and dust generation is prevented.

The above objects are achieved by conducting a specific cooling treatment in a surface crosslinking treatment.

A first surface crosslinking treatment method of a water-absorbing resin powder is a surface crosslinking treatment method of a water-absorbing resin by adding a surface crosslinking agent to a water-absorbing resin powder and heat treating the mixture, wherein the water-absorbing resin powder after the heat treatment is stirred and cooled under an air flow, A second surface crosslinking treatment method of a water-absorbing resin powder is a surface crosslinking treatment method of a water-absorbing resin by adding a surface crosslinking agent to a water-absorbing resin powder and heating the mixture, wherein the water-absorbing resin powder after the heat treatment is cooled under an air flow, and at the same time, at least a part of fine particles of the water-absorbing resin powder and/or the residual crosslinking agent is removed by the air flow.

A third surface crosslinking treatment method of a water-absorbing resin powder is a surface crosslinking treatment method of a water-absorbing resin by adding a surface crosslinking agent to a water-absorbing resin powder and heat treating the mixture, including a step of cooling the water-absorbing resin powder after the heat treatment, thereby agglomerating the water-absorbing resin powder after the heat treatment during the step, and preferably an aqueous solution being added to the water-absorbing resin powder at a temperature of 40-100° C. during the cooling treatment.

In the surface crosslinking of the water-absorbing resin powder in the production of a water-absorbing resin powder, by essentially conducting a specific cooling treatment, reaction of a surface crosslinking agent can be controlled, condensation of moisture generated by surface crosslinking reaction and the like and coagulation of resin particles caused thereby can be prevented, the production can be made stable, and deterioration in physical properties of resin can be prevented. Further, the amount of generated resin fine particles is reduced, and dust generation is prevented, whereby a surface crosslinked water-absorbing resin powder having good morphology can be obtained.

DETAILED DESCRIPTION OF THE PRESENT INVENTION

The present invention is described in detail below.

According to surface crosslinking at a laboratory level, batchwise surface crosslinking, or surface crosslinking in the small-scale production of at most about several tens kilograms per hour as disclosed in the conventional technologies, water-absorbing resins having high physical properties are obtained. However, the present inventors made extensive and intensive investigations about any cause on why in the case of production on an industrial scale, improvements in physical properties by surface crosslinking are not sufficiently exhibited. As a result, it has been found that the cause does not reply on the surface crosslinking itself such as uniformity of the addition of the surface crosslinking agent and its reaction (heat treatment), but considering a cooling step which is conventionally optional, the presence or absence of the cooling step after the surface crosslinking and its manner rather contribute largely to a lowering of the physical properties, leading to accomplishment of the present invention according to the above constitutions, in which the cooling step to which any attention has not hitherto been paid and which is conventionally optional is essential and is improved.

The surface crosslinking treatment of a water-absorbing resin powder of the present invention is conducted by mixing a water-absorbing resin powder and a surface crosslinking agent in a prescribed ratio by a stirring and mixing machine, heating the mixture by a heat treatment machine, and cooling the resulting mixture by a cooling machine, thereby obtaining a surface crosslinked water-absorbing resin powder. In other words, regarding a cooling treatment which is conducted if necessary in the conventional surface crosslinking treatment, the present invention performs a specific cooling treatment, thereby obtaining an excellent water-absorbing resin powder.

Water-Absorbing Resin Powder

The water-absorbing resin powder to which the surface crosslinking treatment of the present invention is subjected is not particularly limited, but conventional water-absorbing resins can be used. Examples include crosslinked polymers capable of absorbing a large amount (5 times or more, and preferably 50-1,000 times the self-weight, under non-pressure) of water in ion exchanged water to form an anionic, nonionic or cationic water-insoluble hydrogel.

The water-absorbing resin powder is generally a resin powder containing, as the major component, a water-absorbing resin having a crosslinking structure, which is obtained by polymerizing a water-soluble unsaturated monomer component (preferably an unsaturated monomer containing an acid group, especially a carboxyl group), and is obtained by polymerizing the monomer in the solution state and drying the resulting polymer, if desired, the polymer being usually pulverized prior to and/or after drying.

The water-absorbing resin is required to be water-swelling and water-insoluble. For this reason, the content of a water-soluble component (for example, an uncrosslinked water-soluble polymer) in the water-absorbing resin is preferably 50% by weight or less, more preferably 25% by weight or less, further preferably 20% by weight or less, further more preferably 15% by weight or less, and most preferably 10% by weight or less. Measurement of absorption magnification and water-soluble content is described in the Examples hereinafter described.

As the formulation of the water-absorbing resin, one or two or more kinds of polyacrylic acid partially neutralized polymers, hydrolyzates of a starch-acrylonitrile graft polymer, starch-acrylic acid graft polymers, saponified materials of a vinyl acetate-acrylic acid ester copolymer, hydrolyzates of an acrylonitrile copolymer or acrylamide copolymer or crosslinked products thereof, carboxyl group-containing crosslinked polyvinyl alcohol modified materials, and crosslinked isobutylene-maleic anhydride copolymers can be enumerated.

These water-absorbing resins are used alone or as a mixture. Of those, acid group-containing water-absorbing resins are preferable, and one kind or a mixture of carboxyl group-containing water-absorbing resins as a carboxylic acid or its salt is more preferable. Typically, those containing, as the major component, a polymer obtained by polymerizing and crosslinking a monomer containing acrylic acid or its salt (neutralized material) as the major component, that is, a polyacrylic acid salt crosslinked polymer optionally containing a graft component, are enumerated.

The polyacrylic acid salt crosslinked polymer as referred to herein means one essentially containing 30% by mole or more and 100% by mole or less in total of acrylic acid and/or its salt in all the monomers. In the present invention, the content of acrylic acid and/or its salt in total is preferably 50% by mole or more, more preferably 70% by mole or more, further preferably 90% by mole, and most preferably substantially 100% by mole. As the acrylic acid salt to be used, monovalent salts of acrylic acid selected from alkali metal salts, ammonium salts, and amine salts are preferable from the standpoint of physical properties. Of these, alkali metal salts of acrylic acid are more preferable, and salts of acrylic acid selected from a sodium salt, a lithium salt, and a potassium salt are further preferable. In the water-absorbing resin, 20-99% by mole, preferably 50-95% by mole, and more preferably 60-90% by mole of the acid group in the polymer is neutralized. The neutralization may be carried out against the monomer prior to the polymerization or during the polymerization, or against the polymer after the polymerization.

As described previously, although the monomer comprises acrylic acid and/or its salt as the major component, other monomers may be used jointly. Examples of monomers to be used jointly include those containing water-soluble or hydrophobic unsaturated monomers as copolymerization components, such as methacrylic acid, (anhydrous) maleic acid, fumaric acid, crotonic acid, itaconic acid, vinylsulfonic acid, 2-(meth)acrylamide-2-methylpropanesulfonic acid, (meth)acryloxyalkanesulfonic acids, and alkali metal salts or ammonium salts of these acids, N-vinyl-3-pyrrolidone, N-vinylacetamide, (meth) acrylamide, N-isopropyl (meth)acrylamide, N,N-dimethyl (meth)acrylamide, 2-hydroxyethyl (meth)acrylate, methoxypolyethylene glycol (meth)acrylate, polyethylene glycol (meth)acrylate, isobutylene, and lauryl (meth)acrylate.

The crosslinking method that is employed in the present invention is not particularly limited, but a method in which a prescribed amount of an internal crosslinking agent is previously added to an unsaturated monomer to undergo polymerization, thereby conducting crosslinking reaction simultaneously with or after the polymerization is preferable. As the internal crosslinking agent that is used in such a method, one or two or more kinds of internal crosslinking agents such as N,N'-methylenebisacrylamide, (poly)ethylene glycol di(meth)acrylate, (poly)propylene glycol di(meth)acrylate, (polyoxyethylene)trimethylolpropane tri (meth)acrylate, trimethylolpropane di(meth)acrylate, poly-ethylene glycol di($\beta$-acryloyloxypropionate), trimethylolpropane tri($\beta$-acryloyloxypropionate), poly(meth) acryloxyalkanes, polyethylene glycol diglycidyl ether, ethylene glycol, polyethylene glycol, and glycerin are used. In the case where one or more kinds of internal crosslinking agents are used, it is preferred to essentially use a compound having two or more polymerizable unsaturated groups while taking into consideration absorption characteristic of the resulting water-absorbing resin, and the like. The amount of the internal crosslinking agent to be used is preferably in the range of 0.005-2% by mole, more preferably 0.01-1% by mole, and further preferably 0.05-0.2% by mole, based on the monomer component.

The monomer is preferably subjected to radical polymerization as an aqueous liquid or an aqueous solution having a concentration of 15-80% by weight, preferably 20-70% by weight, and more preferably 30-60% by weight. In polymerizing the aqueous monomer solution, one or two or more kinds of polymerization initiators such as potassium persulfate, ammonium persulfate, sodium persulfate, t-butyl hydroperoxide, hydrogen peroxide, 2,2'-azobis(2-amidinopropane) dihydrochloride, 2-hydroxy-1-phenyl-propan-1-one, and benzoin methyl ether can be used. Further, a reducing agent or ultraviolet rays capable of promoting decomposition of such a polymerization initiator can be used jointly. Examples of the reducing agent include (bi)sulfites (for example, sodium sulfite and sodium hydrogensulfite), L-ascorbic acid (salts), reducing metal (salts) (for example, ferrous salts), and amines, but it should not be construed that the present invention is limited thereto. Redox polymerization with a persulfate and/or hydrogen peroxide is preferably applicable. The amount of the polymerization initiator or reducing agent to be used is usually 0.001-2% by mole, and preferably 0.01-0.5% by mole, based on the monomer.

As the polymerization method to be employed in the present invention, aqueous solution polymerization or reversed phase suspension polymerization is applicable. The aqueous solution polymerization is a polymerization method in which an aqueous monomer solution is not suspended and is directly polymerized, and is described in, for example, U.S. Pat. Nos. 4,625,001, 4,985,514, 5,124,416 and 5,250, 640, Japanese Patent No. 2,966,539, WO 01/38402, and U.S. Pat. Nos. 5,149,750, 4,769,427 and 4,873,299. The reversed phase suspension polymerization as referred to herein is a polymerization method of suspending an aqueous monomer solution in the particulate state of about 2-0.01 mm in a hydrophobic organic solvent and involves such an advantage that gel particles having the product particle size are obtained at the same time of the polymerization. The reversed phase suspension polymerization is described in, for example, U.S. Pat. Nos. 4,093,776, 4,367,323, 4,446, 261, 4,683,274 and 5,244,735.

The gel state crosslinked polymer obtained by the polymerization step (particularly, aqueous solution polymerization) is optionally divided by a meat chopper or a gel pulverizer enumerated in Japanese Patent Application No. 2001-232734. More preferably, the resulting polymer is dried and optionally pulverized or classified. The drying temperature and method are not particularly limited, but, for example, the drying is preferably carried out at a temperature in the range of 100-300° C., and more preferably 150-250° C.

In the case where the water-absorbing resin is a powder, its weight average particle size is preferably in the range of 100-1,000 µm, more preferably 200-600 µm, and especially preferably 300-500 µm, from the standpoint of physical properties. Further, it is preferable that the content of coarse particles of 850 μm or larger or fine powders of 150 μm or smaller is as small as possible. Specifically, each content is preferably 10% by weight or less, more preferably 5% by weight or less, and most preferably 1% by weight or less. The water-absorbing resin is adjusted such that the solids content of resin determined from its drying loss (after heating 1 g of the powder at 180° C. for 3 hours) is in the range of 80% by weight or more, preferably 85-99% by weight, more preferably 90-98% by weight, and most preferably 92-97% by weight. Further, the water-absorbing resin preferably has a bulk specific gravity (defined in U.S. Pat. No. 6,562,879) of 0.5-0.9 g/ml, more preferably 0.6-0.8 g/ml, and most preferably 0.65-0.75 g/ml.

In the present invention, the production of a water-absorbing resin powder prior to the surface crosslinking treatment is not particularly limited but can be carried out by conventional methods. For example, the method described in JP-A-2002-121291 can be enumerated, in addition to the above-described aqueous solution polymerization and reversed phase suspension polymerization.

Heat Treatment Step

In the surface crosslinking treatment method of a water-absorbing resin powder of the present invention, first of all, a surface crosslinking agent is added to the water-absorbing resin powder, thereby conducting heat treatment. The surface crosslinking treatment described below is not limited to one time, but may be conducted two times or more.

Mixing of the water-absorbing resin powder with the surface crosslinking agent is usually carried out in a variety of mixing machines in a proportion of the surface crosslinking agent of 0.001-10 parts by weight, preferably 0.01-5 parts by weight, and more preferably 0.05-3 parts by weight, based on 100 parts by weight of the water-absorbing resin powder.

The mixing may be carried out upon dispersing the water-absorbing resin powder in an inert solvent. However, it is preferable that the surface crosslinking agent or its solution or dispersion is dropped or sprayed, preferably sprayed directly to the water-absorbing resin powder. For spraying, a water spray machine described later can be employed, and the size of droplets in the case of spraying will be described later.

The surface crosslinking agent is preferably added to a solvent to prepare a solution, especially an aqueous solution, which is then mixed with the water-absorbing resin powder.

The amount of the solvent is properly determined such that it is usually in the range of 0.001-10 parts by weight, preferably 0.01-5 parts by weight, and more preferably 0.05-3 parts by weight, based on 100 parts by weight of the water-absorbing resin powder.

Examples of the mixing machine include continuous or batchwise mixing machines such as a high-speed paddle mixer, an air flow mixing machine, a rotary-disc type mixing machine, a roll mixer, a cylinder type mixing machine, a screw type mixing machine, a tabularizer, Lödige mixer, a nauta type mixing machine, a V-shape mixing machine, a ribbon type mixing machine, a twin arm kneader, a universal mixing machine, and a fluidized mixing machine. The mixing machine is preferably used in the continuous manner. Of these, high-speed stirring mixing machines having the number of rotation of stirring blade of 50 rpm or more, and more preferably 100-10,000 rpm are preferable.

The heating temperature for the surface crosslinking varies depending upon the kind of the surface crosslinking agent. Material temperature or heat medium temperature, preferably material temperature, is preferably 100° C. or higher, more preferably 110-230° C., and most preferably 160-220° C. The heating time is properly determined and is preferably in the range of 1-120 minutes, and more preferably 5-60 minutes. The heating machine to be used for heating is preferably of a continuous mode. Examples include a groove type mixing drying machine, a rotary drying machine, a disc drying machine, a fluidized bed drying machine, an air flow type drying machine, an infrared drying machine, a paddle type drying machine, and a vibration fluidized drying machine.

In the present invention, after the heat treatment step, a cooling treatment step described later is conducted, thereby stopping the crosslinking reaction.

In the present invention, a dehydration reactive crosslinking agent is preferably used as the surface crosslinking agent capable of reacting with a functional group (for example, an acid group) which the water-absorbing resin powder has. The dehydration reactive crosslinking agent as referred to herein means a crosslinking agent capable of causing dehydration reaction, preferably dehydration esterification reaction and/or dehydration amidation reaction, and more preferably dehydration esterification reaction with a functional group (especially a functional group in the vicinity of the surface) of the water-absorbing resin, thereby undergoing crosslinking.

Specifically, in the case where the water-absorbing resin contains a carboxyl group, examples of the crosslinking agent exhibiting dehydration reactivity include hydroxyl group-containing crosslinking agents such as polyhydric alcohols; amino group-containing crosslinking agents such as polyhydric amines; and cyclic crosslinking agents such as alkylene carbonates, mono-, di- or polyoxazolidinone compounds; and oxetane compounds such as 3-methyl-3-oxetanemethanol, in which a hydroxyl group or an amino group formed by open-ring reaction of the cyclic crosslinking agent causes crosslinking reaction. The dehydration reactive crosslinking agent is used singly or in admixture of two or more thereof and may be used jointly with a non-dehydration reactive crosslinking agent such as polyvalent metals.

As the dehydration reactive crosslinking agent that can be used in the present invention, crosslinking agents that undergo dehydration reaction with the functional group of the water-absorbing resin can be used without limitations. Examples include one or two or more members selected from polyhydric alcohol compounds such as ethylene glycol, diethylene glycol, propylene glycol, triethylene glycol, tetraethylene glycol, polyethylene glycol, dipropylene glycol, polypropylene glycol, 1,3-propanediol, 2,2,4-trimethyl-1,3-pentanediol, glycerin, diglycerin, polyglycerin, 2-butene-1,4-diol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, oxyethylene-oxypropylene block copolymers, pentaerythritol, and sorbitol; polyhydric amine compounds such as ethylenediamine, triethylenetetramine, tetraethylenepentamine, pentaethylenehexamine, polyamidopolyamine, polyallylamine, and polyethyleneimine, and condensates of the foregoing polyhydric amines and haloepoxy compounds; alkylene carbonate compounds such as 1,3-dioxolan-2-one, 4-methyl-1,3-dioxolan-2-one, 4,5-dimethyl-1,3-dioxolan-2-one, 4,4-dimethyl-1,3-dioxolan-2-one 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one, and 1,3-dioxopan-2-one, and polyhydric alkylene carbonate compounds such as ethylene glycol bis(4-methylene-1,3-dioxolan-2-one) ether; mono-, di- or polyoxazolidinone compounds; and oxetane compounds such as 3-methyl-3-oxetanmethanol, and polyhydric oxetane compounds.

Of these dehydration reactive crosslinking agents, esterification reactive crosslinking agents capable of crosslinking the carboxyl group in the water-absorbing resin through esterification reaction, specifically at least one member selected from polyhydric alcohols, alkylene carbonates, oxazolidinone compounds, and (polyhydric) oxetane compounds, are preferable as compounds maximally exhibiting the effect of the cooling treatment of the present invention. Especially, it is preferable to use at least a polyhydric alcohol.

In addition to these dehydration reactive crosslinking agents, examples of the surface crosslinking agent further include epoxy compounds such as ethylene glycol diglycidyl ether, polyethylene glycol diglycidyl ether, glycerol polyglycidyl ether, diglycerol polyglycidyl ether, polyglycerol polyglycidyl ether, polyethylene diglycidyl ether, propylene glycol diglycidyl ether, polypropylene glycol diglycidyl ether, glycidol, and γ-glycidoxypropyl trimethoxysilane; polyhydric isocyanate compounds such as 2,4-tolylene diisocyanate and hexamethylene diisocyanate; polyhydric oxazoline compounds such as 1,2-ethylene bisoxazoline; silane coupling agents such as γ-glycidoxypropyl trimethoxysilane and γ-aminopropyl trimethoxysilane; polyhydric aziridine compounds such as 2,2-bishydroxymethylbutanol-tris[3-(1-aziridinyl)propionate]; and salts or hydroxides of a polyvalent metal such as beryllium, magnesium, calcium, strontium, zinc, aluminum, iron, chromium, manganese, titanium, and zirconium.

The surface crosslinking treatment method of the present invention is especially effective in surface crosslinking using an esterification reactive crosslinking agent. In the esterification reactive crosslinking agent, high temperatures are required for dehydration esterification reaction, and the esterification reaction is hardly completed by 100%. Accordingly, it is necessary to use an excessive amount of the crosslinking agent, and regarding a cooling treatment which is conventionally optional, a specific cooling step of the present invention is necessary for stopping the high-temperature dehydration esterification. In the case where no cooling step of the present invention is applied, the water-absorbing resin powder taken out from a reacting machine (heating device) for the surface crosslinking step proceeds with dehydration esterification reaction while keeping the high temperature. Therefore, it was revealed that in an industrially large scale (for example, 300 kg/hr or more), causes of physical property reduction are due to that the dehydration esterification proceeds by halves in the subsequent steps (for example, a conveyance step, a storage step, and optionally a granulation step or an addition step of additives), whereby physical properties of the water-absorbing resin are reduced or deviated. With respect to such a phenomenon, the effect of cooling according to the present invention is not observed in the production at a laboratory level or the production in a pilot or small-scale plant. However, as a result of extensive and intensive investigations for dissolving the reduction in physical properties during the scale-up process, it has been found that the effect of cooling according to the present invention is revealed in the large-scale production.

The surface crosslinking treatment method of the present invention is preferably applied to the case where the crosslinking reaction is dehydration esterification reaction and is more preferably applied to the case where the crosslinking reaction is dehydration esterification reaction, and the reaction is not completed. That is, it is preferable that in the dehydration esterification, the heat crosslinking step is terminated at the time when the crosslinking agent or its decomposition material (for example, a crosslinking agent such as polyhydric alcohols, alkylene carbonates, and oxazolidinones; or polyhydric alcohols derived from decomposition of alkylene carbonates or alkanolamines derived from decomposition of oxazolidinones) remains, and cooling is conducted in the cooling step, thereby stopping the crosslinking reaction.

The case where the dehydration esterification reaction is completed by 100% is not preferable because the reaction time is so long that the productivity may likely lower, and the water-absorbing resin may be likely deteriorated or colored with the progress of heat treatment at high temperatures. In the present invention, since the dehydration esterification reaction is not completely by 100%, and the reaction is intentionally stopped by rapid cooling, the reaction time is short, and the water-absorbing resin is free from deterioration. Further, in the case of a continuous heating, physical properties are reduced by the conventional flow deviation. However, in the present invention, such problems are not involved, and high physical properties are achieved. The amount of the residual surface crosslinking agent or hydrolyzate thereof is controlled within the range of 5-95% by mole, preferably 10-90% by mole, and more preferably 20-70% by mole, of the crosslinking agent to be added. In the case where the residual amount is too large, not only such is not economical, but also the physical properties may possibly lower. On the other hand, in the case where the residual amount is too small, deterioration or coloration may possibly occur due to the reaction over a long period of time. Incidentally, the residual amount can be quantitatively determined with ease by means of liquid chromatographic analysis after extraction from the final water-absorbing resin (and concentration of the extract and further dissolution, if desired).

Cooling Treatment Step

The first surface crosslinking treatment method of a water-absorbing resin powder according to the present invention has been made by finding that by conducting a cooling treatment step by stirring and cooling a surface crosslinked water-absorbing resin powder after heat treatment step under an air flow, reaction of the surface crosslinking agent can be controlled, condensation of moisture generated by the surface crosslinking reaction or the like (steam generated by heating), and coagulation of the resin particles caused thereby can be prevented, thereby making the production stable, and deterioration of the resin in physical properties can be prevented.

A cooling machine that is used in the cooling treatment step in the present invention is a device to be connected to the device for conducting the surface treatment for the purpose of cooling the surface crosslinked water-absorbing resin after the surface treatment to from approximately room temperature to 60° C. Examples of the device to be used include a groove type mixing cooling machine, a rotary cooling machine, a disc cooling machine, a fluidized bed cooling machine, an air flow type cooling machine, a paddle type cooling machine, a vibration fluidized cooling machine, and an air flow-combined paddle cooling machine, each being equipped with a ventilation mechanism of air flow.

After completion of the surface treatment, the surface crosslinked water-absorbing resin is continuously fed into the connected cooling machine. The temperature at the time of feeding is within the range of from (surface treatment temperature) to [(surface treatment temperature)–30° C.] and varies depending upon the circumferential temperature, the connecting distance, and the like.

In the cooling machine, the water-absorbing resin has a temperature gradient. That is, the cooling machine exhibits the surface treatment temperature or a temperature close to the surface treatment temperature in the vicinity of its inlet, whereas it exhibits a temperature close to the cooling-programmed temperature in the vicinity of its outlet. Examples of factors capable of controlling the outlet temperature include the coolant temperature, the heat transfer area of cooling machine, and the retention time within the cooling machine but may be properly set up such that the outlet temperature reaches the desired value.

In the present invention, for the sake of achieving the object, it is preferable that the water-absorbing resin taken out from the heat treatment machine after the surface crosslinking is cooled within one minute, and more preferably within 30 seconds. The heat treating machine and the cooling machine are substantially connected. Further, from the standpoints of physical properties and productivity, the temperature of the water-absorbing resin at the time of start of cooling is 150-250° C., and the temperature after cooling is 40-100° C., preferably 50-90° C., and more preferably 50-80° C.

Cooling Treatment with Stirring

The cooling treatment with stirring as referred to in the first surface crosslinking treatment method of a water-absorbing resin powder according to the present invention refers to a treatment by means of mechanical stirring (may be combined with stirring by an air flow) or a treatment by means of a combination of stirring by vibration with stirring by an air flow, and means a treatment in which the water-absorbing resin powder is stirred, during which the water-absorbing resin powder is continuously or batchwise cooled in a mixing machine (cooling machine) having a forced cooling function, and the cooling treatment with stirring is carried out under an air flow as an essential condition.

Mechanical Stirring

With respect to a stirring device having a rotation axis to be used for stirring and cooling, mixing machines capable of ventilating an air flow and having a cooling function are widely used as a cooling machine. The air flow direction can be upper, lower, left or right direction, and is not particularly limited so long as its object is achieved. Specific examples of the stirring device include cooling machines in which an air flow is ventilated into the types in which the rotation axis is horizontal, and the vessel itself rotates (for example, various mixing machines of a horizontal cylinder type, an inclined cylinder type, a V-shape type, a double cone type, a regular cube type, an S-shape type, and a continuous V-shape type) and types in which the rotation axis is horizontal, and the vessel itself is fixed (for example, various mixing machines of a ribbon type, a screw type, a conical screw type, a groove type stirring type, a high-speed fluidized type, a rotary disc type, a muller type, a paddle type, a rotary type, and a disc type). Above all, vessel-fixed type cooling machines provided with a rotational stirring blade capable of stirring the water-absorbing resin and which ventilate air flow are preferably used. These machines are used in a continuous or batchwise manner, and preferably in a continuous manner. The device is required to have an upper space sufficient for ventilating the air flow in other sections than the fixed vessel section in which stirring is conducted. The packing rate of the water-absorbing resin is preferably 10-100% of the inner volume of the fixed vessel.

Stirring by Vibration

The stirring by vibration as referred to herein means a stirring operation in which mechanical vibration is imparted to the water-absorbing resin particles, thereby subjecting the particles to three-dimensional movement by vibration.

The stirring by vibration can be realized by using an eccentric motor (vibrating motor), an electromagnet, etc. Incidentally, an eccentric motor is preferable because the vibration angle, the number of vibration, or the stroke can be easily controlled.

It is possible to vertically move the particles or change the movement to translation motion in the lateral direction according to the direction of vibration to be imparted (vibration angle). With respect to the vibration direction, adaptive conditions to the device may be properly set up.

In stirring by vibration, for the sake of promoting discharge from the device, it is preferred to set up the vibration angle at larger than 0° but less than 90°. In the case where the vibration angle falls outside this range, though stirring by vibration of the water-absorbing resin occurs, the water-absorbing resin is not discharged. Alternatively, a problem such that a necessary retention time is not gained due to excessive discharge may possibly occur. It is more preferable that the vibration angle exceeds 30° but is less than 70°.

For example, in the case of a vibration fluidized cooling machine, the vibration angle is about 60°, the number of vibration is about 1,000 cps, and the stoke is about 3 mm.

Stirring by Air Flow

The stirring by an air flow as referred to herein means a stirring operation in which an air flow is blown into the water-absorbing resin particles, thereby subjecting the particles to three-dimensional movement by the air flow. Though the direction in which the air flow is blown is not particularly limited, it is preferred to blow the air flow into the particles from the lower direction.

In the case where the air flow is blown from the lower direction, the airflow rate is required to be a terminal velocity of the particles to be stirred in the air flow or more (the air flow as referred to herein is generally air, nitrogen, or the like). The larger the particle size, the larger the terminal velocity is. In the case where the stirring is carried out at a fixed airflow rate, particles having a small particle size vigorously move, whereas particles having a large particle size gently move. An airflow rate of the terminal velocity of the particles or more may be chosen as the need arises.

The airflow rate as referred to herein is an airflow rate usually called a superficial airflow and means an airflow rate in the vertical cross-section against the direction in which the air flow flows. The terminal velocity as referred to herein is a drop speed at which the item of acceleration is zero (i.e., velocity becomes constant) in the movement equation (considering fluid resistance) relating to free drop in fluid.

In the present invention, in stirring by an air flow, an upper limit of the airflow rate is usually the terminal velocity of the water-absorbing resin particles having a maximum particle size in the water-absorbing resin. The airflow rate is preferably not more than about the terminal velocity of particles having a weight average particle size, and more preferably not more than about 50% of the terminal velocity of particles having a weight average particle size.

More specifically, the maximum airflow rate is usually about 5 m/s. In the case where the weight average particle size is about 400 μm, the maximum airflow rate is preferably 2.5 m/s or less, and more preferably 1.3 m/s or less. When the airflow rate is too large, there is encountered such a problem that the water-absorbing resin flies out from the device. On the other hand, when it is extremely small, there is encountered such a problem that the stirring is not conducted.

The terminal velocity may be determined by numerical analysis using the particle size, density, air flow temperature and viscosity according to the movement equation of particles to which fluid resistance is considered, or may be properly determined through actual experiments.

The vibration fluidized cooling machine as referred to herein is a cooling machine capable of realizing stirring by vibration and stirring by an air flow and means a device of conducting cooling while using the vibration and air flow jointly and fluidizing the water-absorbing resin powder. Examples include a continuous vibration drying and cooling machine manufactured by Tamagawa Machinery Co., Ltd., a vibration drying and cooling machine manufactured by Dalton Corporation, and a vibration type fluidized bed drying and cooling machine manufactured by Tsukishima Kikai Co., Ltd. Also, for the sake of promoting cooling, a heat transfer pipe such as a cooling pipe may be provided jointly in the device.

The vibration fluidized cooling machine fluidizes the water-absorbing resin powder layer by mechanical vibration and an air flow, during which the water-absorbing resin is cooled by the air flow introduced in the cooling machine. The number of vibration is usually 1,000 cps (count per sec), and the stoke is about 3 mm.

Examples of devices of applying a combination of mechanical stirring and fluidizing stirring by an air flow include Frigomix manufactured by Nisshin Engineering Inc. and a fluidized bed-equipped rotary disc type drying and cooling machine manufactured by Tsukishima Kikai Co., Ltd. However, it should not be construed that the present invention is limited thereto.

A cooling machine of applying a combination of mechanical stirring and an air flow stirs the water-absorbing resin powder by mechanical stirring and an air flow, during which the water-absorbing resin is cooled by heat transfer against the inner surface of the cooling machine and/or rotational stirring axis and the air flow to be introduced. The stirring and mixing is usually carried out at a rotational stirring rate in the range of 1-1,000 rpm, preferably 3-500 rpm, and more preferably 5-100 rpm. In this case, the air flow rate is usually 0.01 m/sec or more, preferably 0.1-10 m/sec, and more preferably 0.2-5 m/sec, in terms of linear rate (ventilation amount per cross-sectional area of the vessel).

Further, in the present invention, the water-absorbing resin powder is subjected to mechanical stirring and cooling treatment under an air flow. During this, it is preferable that the water-absorbing resin is subjected to cooling treatment under an air flow, and at the same time, at least a part of fine particles of the water-absorbing resin powder or the residual surface crosslinking agent is removed as described later. Further, for removing at least a part of fine particles of the water-absorbing resin powder or the residual surface crosslinking agent by an air flow, the air flow is suitably used. It is also preferable that the water-absorbing resin is fluidized by stirring with an air flow, and an air flow in an excessive amount to that of the air flow necessary for simply fluidizing the water-absorbing resin is fed, thereby removing fine powder of the water-absorbing powder or the residual crosslinking agent. Further, a continuous moving-fluidized bed in which an excessive amount of the air flow is inserted from the bottom can be used as the cooling machine in the present invention.

That is, in the first invention, a cooling machine capable of undergoing stirring and mixing by mechanical stirring (may be combined with stirring by an air flow) or by a combination of stirring by vibration with stirring by an air flow is used. In the second invention, at least a part of fine particles of the water-absorbing resin powder or the residual surface crosslinking agent is removed by an air flow; a cooling machine is not particularly limited so far as it has such a structure that it can fully ventilate the air flow and undergo cooling; and in addition to the cooling machine capable of undergoing stirring and mixing by ventilating an air flow, which is used in the first invention, a continuous moving-fluidized bed can be used as the cooling machine.

In the present invention, it is preferable that the stirring and cooling machine to be used for conducting the cooling treatment with stirring has a rotational stirring axis. The rotational stirring axis is a single axis or a multiple axis (twin axes or triple axes) and usually has a rotational stirring blade (paddle), thereby rotationally stirring the water-absorbing resin powder within the cooling machine. The rotational stirring is carried out in the cooling machine in the state that the water-absorbing resin powder is substantially packed or accumulated in the lower portion, during which the water-absorbing resin is cooled (quenched) by heat transfer against the inner surface of the cooling machine and/or rotational stirring axis.

For example, the stirring and cooling is conducted with a low speed stirring and cooling machine equipped with a single axis or multiple axis paddle, and the water-absorbing resin powder is fluidized in a piston flow in the cooling machine. Such a low speed stirring and cooling machine that can be used is, for example, CD dryer manufactured by Kurimoto Tekkousho or Ink rind disk type dryer manufactured by Tsukishima Kikai Co., Ltd.

As the characteristics of those low speed stirring and cooling machines, the speed of the rotational stirring axis is usually 100 rpm (revolution per minute) or less, preferably 50 rpm or less, and more preferably 5-30 rpm. The peripheral speed of the outermost periphery of the paddle is usually 5 m/s or less, which, however, varies depending upon the paddle size.

In the case where the rotation speed is low, the cooling effect is not sufficiently achieved, whereby the effect of the present invention cannot be obtained. On the other hand, when the rotation speed is too high, the water-absorbing resin is damaged due to friction or mechanical breakage, whereby the physical properties lower.

Figure 1:
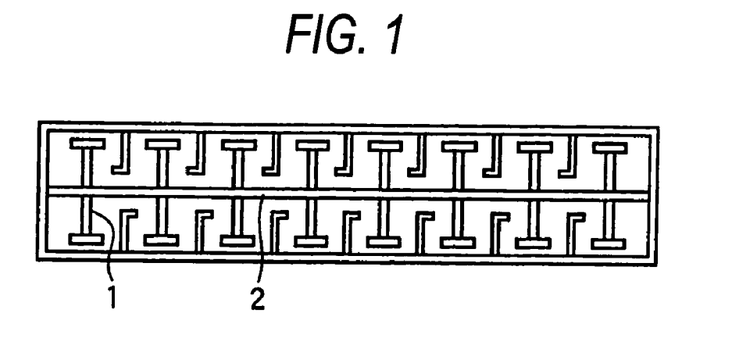
FIG. 1 is a view showing a cooling machine having rotational stirring blades, which is seen from the upper side.
Figure 2:
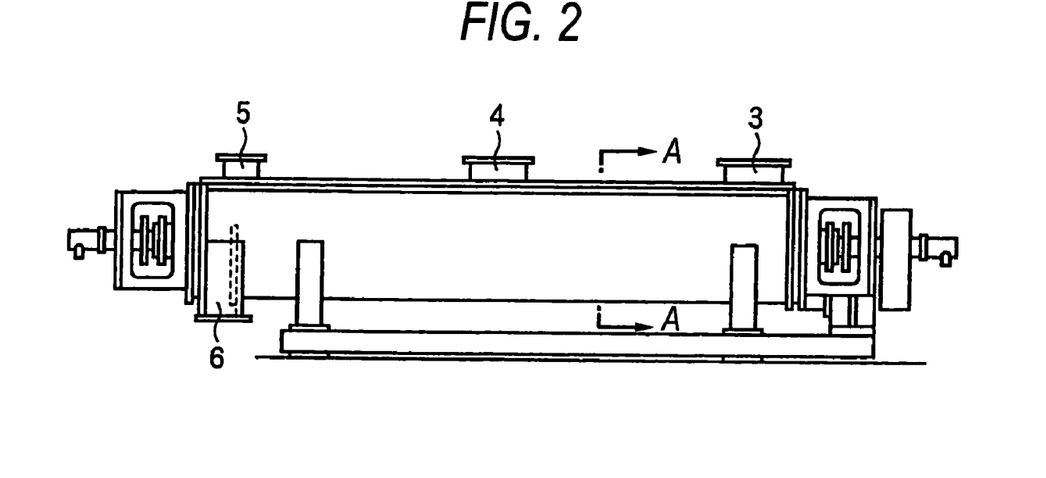
FIG. 2 is a side view of the cooling machine of FIG. 1.
Figure 3:
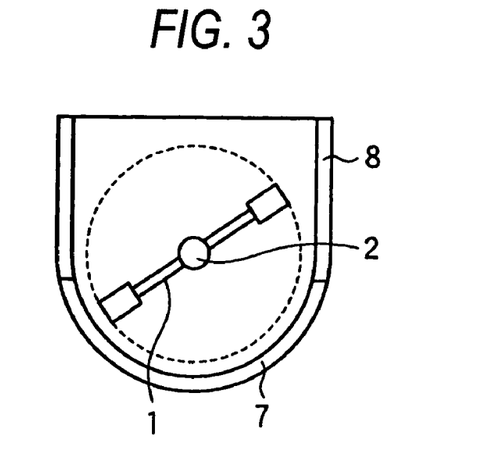
FIG. 3 is a cross-sectional view along an A-A line of FIG. 2.

Examples of such stirring and cooling machines include cooling machines having a rotational stirring blade shown in FIGS. 1 to 3.

FIG. 1 is a view showing a cooling machine having rotational stirring blades 1, from which an upper lid is removed and which is seen from the upper side. An axis 2 is driven by a motive power of a motor or the like and rotates the rotational stirring blades 1.

FIG. 2 is a side view of the cooling machine of FIG. 1, in which a resin powder is thrown from an input port 3 and recovered from a recovery port 6. The pressure in a jacket can be reduced, and an air flow can be introduced by utilizing the input port 3, the recovery port 6, and air outlets 4 and 5.

FIG. 3 is a cross-sectional view along an A-A line of FIG. 2. In a bottom jacket 7 and an upper jacket 8, the rotational stirring blade 1 rotates by drive of the axis 2.

In such a cooling machine, continuous feed is carried out, and if under an air flow, the feed may be in the lengthwise direction (the water-absorbing resin is fed from the upper side to the lower side) or in the lateral direction (the water-absorbing resin is fed in the lateral direction). The packing state in the cooling machine is properly determined, and the water-absorbing resin powder is packed in the accumulated state by self-weight (the thickness is usually 1-100 cm, preferably 5-80 cm, and more preferably 10-50 cm) and preferably rotated and stirred under an air flow.

Under Air Flow

The term "under an air flow" as referred to herein means that an air flow (flow of a gas) is essential in the space of the cooling machine. In the case wherein no forced ventilation from the outside or into the outside is carried out, not only the water-absorbing resin after cooling is deteriorated in hygroscopic fluidity (powder fluidity and anti-blocking property after moisture absorption), but also the absorption magnification under pressure or the like is unstable from the standpoint of physical properties.

Examples of the air flow include air, inert gases (for example, nitrogen gas), and mixtures thereof and may be any air flow under vacuum, pressure or atmospheric pressure.

The cooling machine may have an external mechanism of blowing air or reducing the pressure such that the air flow having a temperature of usually from −50 to 100° C., preferably 0-50° C., and more preferably 10-40° C., is ventilated in the cooling machine. Incidentally, though the cooling machine may be of a type having a rotational stirring axis (stirring blade), the rotation does not generate an air flow. In the present invention, an air flow is ventilated under reduced pressure or by air blowing.

With respect to the structure of the cooling machine, cooling by heat transfer with a jacket in which a coolant is flown on the wall surface thereof is preferable. Further, other method may be employed jointly. The temperature of the coolant is usually from −50 to 90° C., preferably 0-70° C., and more preferably 10-60° C. In the case where the temperature of the coolant is too low, the water-absorbing resin may possibly cause coagulation. On the other hand, in the case where the temperature of the coolant is too high, a sufficient cooling effect is not obtained.

As the method of ventilating an air flow, in the case of stirring and cooling, examples include a method in which one side of ports of the cooling machine is opened as an air inlet, thereby undergoing suction (vacuum) from another port and a method in which one side of ports of the cooling machine is opened as an air outlet, thereby blowing air (under pressure) from another port, but the present invention does not care this matter. The air inlet or air outlet is limited to the air flow but may also serve as a discharge port or injection port of the water-absorbing resin. However, it is preferable that they are separately provided.

It is preferable that the air flow is made under a reduced pressure condition (suction condition). The vacuum degree is preferably 0.5-300 mm $H_2O$ (water-gauge pressure), more preferably 1-100 mm $H_2O$, and more preferably 5-50 mm $H_2O$. When the vacuum degree is insufficient or excessive, a sufficient cooling effect is not obtained, and therefore, such is not preferable.

Removal of Part of Fine Particles of Water-Absorbing Resin Powder or Residual Surface Crosslinking Agent by Air Flow The second surface crosslinking treatment method of a water-absorbing resin powder according to the present invention has been made by finding that in the cooling treatment step, by removing at least a part of fine particles of the water-absorbing resin powder or the residual surface crosslinking agent by an air flow, the physical properties of the resulting water-absorbing resin powder become good. In that case, although the cooling treatment step may be cooling treatment under an air flow, the foregoing stirring and cooling treatment by an air flow is preferable.

The removal of at least a part of the water-absorbing resin fine particles or the residual surface treating agent may be achieved by continuously throwing a water-absorbing resin into a device having an upper space to generate a powder dust of the water-absorbing resin in a cooling machine and removing the powder dust by an air flow. Further, it may be achieved by cooling a water-absorbing resin to generate the residual surface crosslinking agent in an upper space and removing the generated residual crosslinking agent by an air flow. In the case of using a cooling machine of undergoing mechanical stirring and mixing, into which an air flow is ventilated and which is used in the first invention, the water-absorbing resin is mechanically stirred, preferably mechanically stirred by a rotational stirring blade. During this, the removal may be achieved by ventilating an air flow in an amount sufficient for removing at least a part of fine particles of the water-absorbing resin powder or the residual surface crosslinking agent. Although the amount of an air flow to be ventilated is properly determined, it is preferable that the air flow is made in vacuo within the foregoing range. In the case where a continuous moving-fluidized bed is employed as the cooling machine of the present invention, the removal may be achieved by feeding an excessive amount of an air flow against the necessary amount for fluidizing the water-absorbing resin to remove the fine particles of the water-absorbing resin powder or the residual crosslinking agent.

The trapped fine particles of water-absorbing resin power can be reused as it is or after agglomeration as the need arises.

With respect to the fine particles of the water-absorbing resin powder to be removed, fine particles having a particle size of 150 μm or smaller, and preferably 106 μm or smaller, are removed. The removal amount is in the range of 0.01-10% by weight, preferably 0.05-5% by weight, and more preferably 0.1-3% by weight, of the whole. In the case where the removal amount is small, various physical properties such as hygroscopic fluidity and absorption magnification under pressure lower. On the other hand, in the case where the removal amount is large, the yield lowers. The water-absorbing resin powder removed by an air flow may be properly recycled or separately used as a fine powder of a water-absorbing resin.

It is preferable that the residual crosslinking agent, preferably the above-described ester reactive crosslinking agent, is removed using an air flow. The removal amount is preferably 0.01-50% by weight, more preferably 0.05-40% by weight, and most preferably 0.1-30% by weight, of the used crosslinking agent. When the residual crosslinking agent is removed, various physical properties of the water-absorbing resin such as hygroscopic fluidity are improved.

Treatment Amount

The effect to be brought by the stirring and cooling step under an air flow and the removal of a part of the water-absorbing fine particles or the residual surface crosslinking agent by an air flow is suitable for large-scale production of a fixed amount or more per line, and especially for continuous production. In the large-scale production, for example, production provided with a cooling step having a production amount of 300 kg/hr or more, preferably 500 kg/hr or more, and more preferably 700 kg/hr, per line, the effect for improving the physical properties of the water-absorbing resin powder is remarkable. It may be considered that although in the large-scale production, there are many factors with respect to the deterioration in physical properties such as a lowering of the fluidity and clogging depending upon the morphology of the resin powder and others, the present invention can avoid them by the cooling treatment.

The upper limit of the treatment amount is not particularly defined. However, when the scale is excessively large, the control may possibly become difficult, or the physical properties may possibly lower. In general, when the treatment amount is up to about 10,000 kg/hr per device, no problem occurs, and therefore, such is preferable.

It is preferable that the cooling machine is disposed such that continuous feed can be conducted. Although the cooling machine may be placed lengthwise (the water-absorbing resin is fed from the upper side to the lower side) or laterally (the water-absorbing resin is fed in the lateral direction), it is preferably disposed in the lateral direction from the standpoint of physical properties of the resulting resin powder. The cooling machine is not placed vertically or horizontally but is preferably provided with a downward inclination. It is especially preferable that the cooling machine is placed laterally and provided with a downward inclination. In the case where no inclination is provided, with respect to the powder characteristics of the heated water-absorbing resin, it is difficult to stably feed the water-absorbing resin, whereby the physical properties may possibly lower or may be possibly unstable. The downward inclination is properly determined but is preferably about 0.1-30°, more preferably about 1-20°, and most preferably about 3-15°.

Further, in the method of surface crosslinking by adding a surface crosslinking agent to a water-absorbing resin powder and heat treating the mixture according to the present invention, it is preferred to use a reaction device having a downward inclination. That is, the inclination is applied to not only the cooling machine provided with an inclination but also the heat treatment prior to cooling, whereby it becomes possible to design to improve physical properties of the water-absorbing resin of the present invention. The downward inclination improves the piston flow property in continuous operation of the powder, and its switching at the time of changing products becomes easy.

Piston flow (also called Plug Flow) is ideally defined as a flow that a material flown through a device moves with a uniform velocity distribution in a direction vertical to a flow of from inlet of the device to outlet thereof, without mixing or diffusion in a flow direction.

By the improvement of piston flow property of the water-absorbing resin powder, retention time of the water-absorbing resin powder in a heat treating machine or cooling machine thereof becomes stable, so that a stable heat crosslinking treatment/cooling treatment can be performed. As a result, the water-absorbing resin powder with high physical properties can be produced in a stable manner, and also local long-term retention is overcome. Consequently, it is difficult to cause powdering of the water-absorbing resin, and generation of fine powder can be suppressed.

Further, in the addition of an aqueous liquid described hereinafter, by the improvement of piston flow property, formation of zone of essential specific temperature region in a power layer in the cooling device becomes further clear, and this facilitates addition of the aqueous liquid.

In the case where piston flow property is low, deviation of retention time of the water-absorbing resin powder in the heat treating machine/cooling machine becomes large. As a result, physical properties may be unstable, or products having low physical property and a large amount of fine powder may be obtained. Further, formation of zone of a specific temperature region which is essential in addition of the aqueous liquid as described hereinafter may become indefinite, or it may be difficult to add the aqueous liquid.

In the surface crosslinking treatment method of the water-absorbing resin powder, it is preferable to add an aqueous solution in the cooling step as described later.

Addition of Aqueous Liquid

The third surface crosslinking treatment method of a water-absorbing resin powder according to the present invention has been made by finding that by adding water or an aqueous solution containing water as the major component (the both will be hereinafter referred to as "aqueous solution") to a water-absorbing resin powder at a temperature of 40-100° C. at the time of cooling after the surface crosslinking treatment, it becomes possible to reduce fine powders and dust generation and obtain a morphology of the water-absorbing resin powder without necessity of the usual agglomeration step, that is, addition of the aqueous solution enables one to realize agglomeration. In other words, the agglomeration can be easily conducted without using equipment exclusive for agglomeration of high costs.

In that case, with respect to the condition of the cooling treatment, at the time of start of the cooling treatment, generally the temperature of the water-absorbing resin powder exceeds 100° C., and after the cooling treatment, the water-absorbing resin powder is preferably cooled to 70° C. or lower. With respect to the cooling treatment, the foregoing cooling treatment under an air flow is preferable, and the stirring and cooling treatment under an air flow is further preferable.

As mentioned above, the addition of water to the adsorbing resin is not generally endothermic, but involves heat generation. By the addition of an aqueous solution to the water-absorbing resin powder of the present invention, exothermic reaction occurs, whereby the water-absorbing resin causes heat generation. However, since the water-absorbing resin is simultaneously forcedly cooled in the cooling machine, the surface characteristic of the water-absorbing resin changes, thereby obtaining more excellent physical properties. Also, it is considered that the generation of fine powders is suppressed, whereby the morphology of the resin powder becomes good.

Also, by the addition of an aqueous solution, the hygroscopic fluidity is further improved. Further, fine powders of the water-absorbing resin are reduced, and the surface breakage of the water-absorbing resin in the subsequent processes can be prevented.

By the specific addition method of the aqueous solution, a water-absorbing resin powder having a mean particle size of 200-600 μm, and preferably 300-500 μm, in which the amount of fine powders of 150 μm or smaller is controlled to 5% by weight or less, preferably 3% by weight or less, and more preferably 1% by weight or less, can be obtained.

The addition of the aqueous solution to the cooling machine is carried out in a field at a temperature of the water-absorbing resin powder of 40-100° C., preferably 50-90° C., and more preferably 60-80° C. The term "field" used herein means a zone having a specific temperature, for example, in the case that temperature changes (lowers) in the water-absorbing resin of continuous flow. Where an aqueous liquid is added in a field of 40° C. or lower, the water-absorbing resin may convert to a lamp, thereby clogging outlet of the cooling machine, the water-absorbing resin may adhere to a heat conductive surface of the cooling machine, thereby decreasing a heat conductive efficiency, or when the lamp is destroyed, the water-absorbing resin itself constituting the lamp may be damaged, thereby decreasing physical properties. Further, where an aqueous liquid is added in a field of 100° C. or higher, low boiling components, such as water, in the aqueous liquid added evaporate, and thus, the aqueous liquid is not effectively added to the water-absorbing resin. In addition to this, moisture condensation occurs in the inside of the cooling machine, a lamp is formed by the moisture condensed water, the outlet of the cooling machine is clogged by the lamp, making it difficult to conduct operation in a stable manner, or the water-absorbing resin adheres to a heat conductive surface of the cooling machine, thereby substantially decreasing cooling efficiency or decreasing physical properties of the water-absorbing resin.

In the present invention, it is essential to conduct addition of an aqueous liquid in the above-described temperature field.

As measures for finding such a preferred temperature region within the cooling machine, for example, the temperature is actually measured under a predetermined operation condition. Alternatively, the temperature may be found by numerical analysis by assuming a countercurrent or concurrent contact type heat exchanger from the temperature of the water-absorbing resin at the inlet and outlet of the cooling machine, the heating rate and feed rate of the water-absorbing resin, the temperature of a coolant at the inlet and outlet, and the like, calculating an overall coefficient of heat transfer, and making a heat transfer area as a function of a distance in the flow direction.

The temperature of the aqueous solution to be added is usually 0° C. or higher but lower than the boiling point, and preferably 10-50° C.

The addition amount of the aqueous solution is usually 0.01-50 parts by weight, preferably 0.01-30 parts by weight, and more preferably 0.1-10 parts by weight, based on 100 parts by weight of the water-absorbing resin powder.

With respect to water spraying devices for adding the aqueous solution, any spraying device can be used without particular limitations so far as it is adaptive to the object, but a device capable of uniformly spraying an aqueous solution into a narrow area is preferable. Preferred examples of water spraying devices include single-fluid type or two-fluid type sprays having a spray pattern of flat spray, hollow cone or full cone. For spraying the aqueous solution in a narrow region, narrow angle sprays are more preferable.

The size of droplets to be sprayed is not particularly limited but is preferably 10-1,000 μm on the average. When the droplet size is too large, the water content of the water-absorbing resin becomes non-uniform, and particles having a large amount of water absorbed therein become lump, thereby possibly causing clogging of the device. On the other hand, in the case where the droplet size is less than 10 μm, sprayed water does not effectively adhere to the water-absorbing resin, thereby causing such problems that the water is slashed and discharged out from the device and that it causes condensation. An optimum droplet size is 50-500 μm.

As the general tendency, so far as the air flow within the device is gentle, the droplet size may be small. In the case where the air flow is fast, for the sake of preventing the matter that water is splashed and comes out, it is essential that the spraying is carried out at a large droplet size.

It is preferable that the aqueous solution is added such that it does not come into contact any material other than the water-absorbing resin. However, in the case where there is some possibility that the aqueous solution to be added comes into contact with any portion within the device other than the water-absorbing resin powder, it is preferable to contain an anti-adhesion agent such as polyethylene glycol (PEG) and polypropylene glycol (PPG).

In order to reveal an addition function, a variety of additives may be dissolved or dispersed in the aqueous solution to be added. Examples of such additives include metal salts, acids, alkalis, deodorants, colorants, inorganic or organic anti-fungus agents, and surfactants. More specifically, the aqueous solution to be added can contain sulfurous acid salts such as sodium bisulfite (SBS) for the purpose of reducing the residual monomer; organic or inorganic bases, organic or inorganic acids, or monovalent or polyvalent metal salts (for example, aluminum sulfate) for the purpose of adjusting the water absorption rate; deodorants for the purpose of imparting a deodorizing function; colorants for the purpose of imparting a visual value; and a variety of chelating agents for the purpose of enhancing urine resistance.

The concentration of various additives in the aqueous solution is usually 0.01-50% by weight, preferably 0.1-40% by weight, and more preferably 1-30% by weight in total.

The water-absorbing resin obtained in the first, second or third method of the present invention preferably has a water absorption magnification under pressure (4.9 kPa) against a physiological salt solution of 20 g/g or more, more preferably 23 g/g or more, and further preferably 25 g/g or more. According to the method of the present invention, it is possible to easily and stably produce a water-absorbing resin having such high physical properties that the absorption magnification under pressure (1.9 kPa) against a physiological salt solution is usually 20 g/g or more, preferably 25 g/g or more, more preferably 28 g/g or more, and especially preferably 32 g/g or more and that the water absorption magnification under non-load is preferably 25 g/g or more, more preferably 28 g/g or more, and especially preferably 32 g/g or more. The permeation amount of the liquid under pressure (SFC) is $10 \times 10^{-7}$ or more, preferably $20 \times 10^{-7}$ more, and more preferably $50 \times 10^{-7}$ or more ($cm^3 \cdot s \cdot g^{-1}$). The water-soluble matter and particle diameter are within the above-described ranges.

The water-absorbing resin obtained by the present invention is a water-absorbing resin powder surface-crosslinked with 0.001-10 parts by weight of a ester reactive crosslinking agent, preferably 0.001-10 parts by weight of a polyhydric alcohol, and has the following characteristics.

(1) A polyacrylic acid salt crosslinked polymer having a weight average particle diameter of 200-600 μm, preferably 300-500 μm, and containing particles of 850 μm or more and particles of 150μ or less each in an amount of 1% by weight or less.

(2) Absorption ratio under pressure (4.9 kPa) is 20 g/g or more, preferably 28 g/g or more, more preferably 32 g/g or more.

(3) Absorption magnification under non-load is 25 g/g or more, preferably 28 g/g or more, more preferably 32 g/g or more.

(4) Permeated liquid amount under pressure (SFC) is $10 \times 10^{-7}$ or more, preferably $20 \times 10^{-7}$ or more, more preferably $50 \times 10^{-7}$ or more.

(5) Water-soluble matter is 25% by weight or less, preferably 20% by weight or less, more preferably 15% by weight or less, most preferably 10% by weight or less.

(6) Residual amount of ester reactive crosslinking agent is 5-95 mol %, preferably 10-90 mol %, more preferably 20-70 mol %.

The novel water-absorbing resin of the present invention contains fine powder in small amount and has high physical properties, and the ester reactive crosslinking agent remains in a specific amount.

The cooling machine for water-absorbing resin or heat treating machine used in the present invention is a stirring type machine equipped with an air permeation mechanism of air flow and plural paddles, and is a novel cooling machine or heat trating machine characterized is having downward inclination.

According to the method of the present invention, it is possible to simply produce a water-absorbing resin having good absorption characteristics, which is excellent in absorption magnification under non-pressure, absorption magnification under pressure and balance among soluble components. Although the water-absorbing resin of the present invention is widely useful in agricultural and horticultural water holding agents, industrial water holding agent, hygroscopic agents, dehumidifying agents, building materials, and the like, it is especially suitably used as medical supplies such as paper diapers, incontinence pads, mother's milk pad, and sanitary napkins. Further, since the water-absorbing resin of the present invention is excellent in balance among the foregoing three physical properties, medical supplies (especially, paper diapers) can be used in a high concentration of the water-absorbing resin (weight ratio of the water-absorbing resin to the total of the water-absorbing resin and fiber substrate), specifically in a range of 30-100% by weight, preferably 40-100% by weight, and more preferably 50-95% by weight.

The present invention is described below in more detail by reference the following Examples and Comparative Examples, but it should not be construed that the present invention is limited thereto. Various performances of the water-absorbing resin and water absorbing agent were measured in the following manners.

In the case of a water absorbing agent used as a final product such as medical supplies, since the water absorbing agent absorbs moisture, the water absorbing agent may be properly separated from a final product, dried in vacuo at low temperatures (for example, 12 hours at 1 mm Hg or lower and at 60° C.), and then provided for the measurement. Further, all of the water-absorbing resins used in the Examples and Comparative Examples of the present invention had a water content of 6% by weight or less.

(1) Absorption magnification under non-pressure (absorption magnification under non-pressure against 0.90% by weight physiological salt solution for 30 minutes (CRC)):

A bag made of a non-woven fabric (60 mm×85 mm, Heatron Paper GSP 22, a product of Nangoku Pulp Kogyo K.K.) was uniformly charged with 0.20 g of a water-absorbing resin powder under conditions at room temperature (20-25° C.) and at a humidity of 50 RH %, and sealed. The bag was immersed in a 0.90% by weight physiological salt solution of an excessive amount (e.g., 100 g or more) at room temperature. Thirty minutes later, the bag was lifted up, subjected to hydro-extraction at 250 G for 3 minutes using a centrifuge (Model H-122, manufactured by Kokusan Corporation), and then measured for a weight W1 (g). Also, the same operations were applied without using the water absorbing resin or water absorbing agent, and a weight W0 (g) was measured. Then, an absorption magnification under non-pressure (g/g) was calculated from W1 and W0 according to the following equation.

Absorption magnification under non-pressure (g/g)=[$W1$ (g)–$W0$ (g)–weight of water-absorbing resin or water agent]/[Weight (g) of water-absorbing resin or water absorbing agent]

(2) Absorption magnification under pressure (absorption magnification under a pressure of 4.83 kPa against 0.90% by weight physiological salt solution for 60 minutes (AAP)):

A stainless steel-made 400-mesh screen (mesh size: 38 µm) was fused with the bottom of a plastic supporting cylinder having an inner diameter of 60 mm, and 0.90 g of a water-absorbing resin was uniformly sprayed on the screen under a condition at room temperature (20-25° C.) and at a humidity of 50 RH %. Thereafter, a piston having an outer diameter slightly smaller than 60 mm, which does not generate any gap from the supporting cylinder and the vertical movement of which is not disturbed, as adjusted so as to uniformly apply a load of 4.83 kPa (0.7 psi) against the water absorbing agent and a load were placed thereon in that order, and a weight Wa (g) of this set of measurement device was measured.

A glass filter having a diameter of 90 mm (manufactured by Sogo Rikagaku Glass Seisakusho K.K.; pore size: from 100 to 120 µm) was placed inside a Petri dish having a diameter of 150 mm, and a 0.9% by weight physiological salt solution (20-25° C.) was added such that the height became the same level as the upper face of the glass filter. One filter paper having a diameter of 90 mm (manufactured by Advantec Toyo Kaisha, Ltd., product name: (JIS P3801, No. 2), thickness: 0.26 mm, retention particle size: 5 µm) was placed thereon, the surface of which was entirely wetted, and an excess of the solution was removed.

The above set of measurement device was placed on the moistened filter paper, thereby absorbing the solution on the filter paper under a load. One hour later, the set of measurement device was lifted up, and its weight Wb (g) was measured. Then, an absorption magnification under pressure (g/g) was calculated from Wa and Wb according to the following equation.

Absorption magnification under pressure (g/g)=[$Wa$ (g)–$Wb$(g)]/[Weight (g) of water absorbing agent (0.9 g)]

(3) Weight average particle size:

A water-absorbing resin powder was screened by JIS standard sieves having a mesh size of 850 µm, 710 µm, 600 µm, 500 µm, 425 µm, 300 µm, 212 µm, 150 µm, 106 µm, 75 µm, etc., respectively, and residual percentages R were plotted on logarithmic probability paper, from which was then read a weight average particle size (D50).

The classification method was carried out by charging 10.0 g of a water-absorbing resin in JIS standard sieves having a mesh size of 850 µm, 600 µm, 500 µm, 300 µm and 150 µm, respectively (THE IIDA TESTING SIEVE, size: 8 cm) under a condition at room temperature (from 20 to 25° C.) and at a humidity of 50 RH % and classified for 10 minutes using a vibration classification machine (IIDA SIEVE SHAKER TYPE: ES-65 Model, SER. No. 0501).

(4) Hygroscopic fluidity:

A hygroscopic resin powder (1.0 g) was thinly sprayed on an aluminum dish having a diameter of about 50 mm and allowed to stand for 30 minutes under a condition at 37° C. and at 60 RH %. After moisture absorption, the fluidity was visually evaluated by inclining the aluminum dish.

○: The powder exhibited good fluidity.

Δ: The powder was partly coagulated.

x: The powder was completely coagulated.

(5) Water-soluble matter:

A water-absorbing resin (500 mg) was dispersed in 1,000 mL of deionized water at room temperature, stirred for 16 hours using a 40-mm magnetic stirrer, and then filtered by filter paper (TOYO, No. 6) to separate a swollen gel. Next, a water-soluble polyacrylic acid salt in the filtrated having eluted from the water-absorbing resin was subjected to colloid titration using methyl glycol chitosan and polyvinyl sulfate potassium, thereby determining a weight % of a water-soluble matter in the water-absorbing resin (against the water-absorbing resin).

(6) Residual monomer:

A filtrate separately prepared in (5) and stirred for 2 hours was subjected to UV analysis by liquid chromatography, thereby analyzing the amount of a residual monomer in the water-absorbing resin (ppm by weight against the water-absorbing resin).

(7) Liquid permeability under pressure (SFC):

As a method of measuring the liquid permeability under pressure, 0.9 g of a water-absorbing resin was swollen for one hour under a load of 20 g/cm$^2$ (about 1.9 kPa) and then determined for saline flow conductivity (abbreviated as "SFC") of a swollen gel at 20 g/cm$^2$ (about 1.9 kPa) with a 0.0018 M—NaCl solution (20-25° C.) according to WO 95/22356. Incidentally, the unit is (cm$^3$·s·g$^{-1}$), and the larger the numerical value, the larger the liquid permeability is.

PREPARATION EXAMPLE 1A

An aqueous solution of 38% by weight acrylic acid sodium salt, 71% by mole of which had been partially neutralized, containing 0.05% by mole (against the monomer) of polyethylene glycol diacrylate (n=9) as a crosslinking agent was fed to into a horizontal steel belt polymerizer and continuously subjected to static aqueous solution polymerization (belt holding time: about 30 minutes, thickness: about 25 mm). The resulting water-containing gel state crosslinked polymer of the water-absorbing resin was granulated in the particulate state using a meat chopper, thinly spread and placed on a perforated plate of a band drying machine, and then continuously subjected to hot air drying at 160-180° C. for 30 minutes. There was thus obtained a dry polymer in the block state at an outlet of the drying machine. The dry polymer was taken out and simultaneously crushed, and the resulting particulate dry material was continuously fed at a rate of 1,100 kg/h into a 3-stage roll granulator and pulverized. The resulting powder of the particulate water-absorbing resin at about 60° C. was classified in a screening device provided with a screen having a mesh size of 850 μm, thereby obtaining a water-absorbing resin powder (weight average particle size: 400 μm) in which 90% by weight or more of the particles had a size of 150 μm or more but smaller than 850 μm. The resulting irregularly-shaped water-absorbing resin powder (1) had an average absorption magnification under non-pressure (CRC) of 40 g/g and a water-soluble matter content of 11% by weight.

Further, the water-absorbing resin powder (1) was continuously fed at a rate of 1,000 kg/h into a high-speed continuous mixing machine (Turbulizer, manufactured by Hosokawa Micron Corporation, at 1,000 rpm). Further, an aqueous solution of crosslinking agents consisting of 1,4-butanediol, propylene glycol and water in a ratio of 0.38/0.63/3.5 (% by weight based on the powder) was sprayed to and mixed with a water-absorbing resin by using a spray to form droplets having a mean size of about 200 μm. Next, the resulting mixture was continuously heat treated at 195° C. for 50 minutes in a paddle type low-speed stirring type indirect heat dryer (paddle dryer), to obtain a water absorbing agent powder containing several thousands ppm of the residual polyhydric alcohol (surface crosslinked water-absorbing resin powder).

EXAMPLE 1A

Following the heat treatment by the paddle dryer (manufactured by Nara Machinery Co., Ltd.) of Preparation Example 1A, the water-absorbing resin powder was cooled by a cooling device (jacket temperature: 40° C.) the inside of which was made in vacuo at 100 mm H$_2$O while slightly passing a suction air flow in an upper space of a cooling device in which a coolant (cold water) at 40° C. was flown into a similar paddle dryer connected in series. After cooling, the water-absorbing resin powder was classified by a screen of 850 μm. As a result, the resulting water-absorbing resin powder was excellent in fluidity at the time of moisture absorption, and its physical properties became stable with a lapse of time. Further, fine powders (100 μm or less) were not substantially observed, and coagulation was not seen at the time of preparation. The results are shown in Table 1. A part of the water-absorbing resin fine powder was removed by an air flow at the time of cooling.

EXAMPLE 2A

In Example 1A, following the heat treatment by a paddle dryer, the water-absorbing resin powder was cooled using a fluidized bed under an air flow condition of a yield of 100%. A part of the fine powder was removed by a cyclone at the time of cooling.

COMPARATIVE EXAMPLE 1A

In the Example 1A, the cooling device was not provided, and the water-absorbing resin powder was directly classified by a screen of 850 μm and stored in a product hopper. As a result, physical properties of the resulting water-absorbing resin powder were deviated or reduced, the fluidity at the time of moisture absorption was poor, and fine powders (100 μm or less) were slightly contained in an amount of 0.2%. Further, coagulation was observed at the time of production in the long-term production.

COMPARATIVE EXAMPLE 2A

In Example 1A, an air flow by reduced pressure was not introduced into the cooling device. As a result, adhesion or coagulation of the water-absorbing resin was gradually observed in the 24-hour continuous operation. Further, the fluidity at the time of moisture absorption was poor, and fine powders (not larger than 100 μm) were slightly contained in an amount of 0.1%.

COMPARATIVE EXAMPLE 3A

In Example 1A, following the heat treatment by a paddle dryer, the water-absorbing resin powder was cooled using a fluidized bed (Conduction Flow, manufactured by Okawara Mfg. Co., Ltd.) under an air flow condition of a yield of 100%. Incidentally, the term "yield of 100%" refers to a condition under which the water-absorbing resin is ultimately discharged from the outlet by an air flow necessary and sufficient for fluidizing the water-absorbing resin.

TABLE 1

|  | CRC (g/g) | AAP (g/g) | Hygroscopic fluidity | Removal of crosslinking agent or fine powder |
|---|---|---|---|---|
| Example 1A | 30 | 25 | ○ | Yes |
| Example 2A | 30 | 25 | Δ | Yes |
| Comparative Example 1A | 29 | 23 | x to Δ | No |
| Comparative Example 2A | 29 | 24 | x to Δ | No |
| Comparative Example 3A | 29 | 24 | Δ | No |

It is noted that Example 1A in which the stirring and cooling treatment was carried out under an air flow is excellent in any of water absorption performance and hygroscopic fluidity as compared with Comparative Examples 1A and 2A.

Further, in Example 1A, the air flow was collected from the cooling machine. As a result, the water-absorbing resin powder and the residual crosslinking agent were removed.

It is noted that Example 2A in which the cooling treated under an air flow and the removal of a part of the fine powder were carried out is excellent in water absorption performance as compared with Comparative Example 3A in which the removal of a part of the fine powder was not carried out.

PREPARATION EXAMPLE 1

Preparation of Irregularly-shaped Pulverized Water-absorbing Resin 1:

An aqueous monomer solution consisting of 634.9 g of acrylic acid, 5,564.2 g of a 37% by weight aqueous solution of sodium acrylate, 9.0 g of polyethylene glycol diacrylate having 8 ethylene glycol repeating units as an internal crosslinking agent, and 322 g of water was fed into a reaction machine constituted of a jacketed, lidded stainless steel kneader having an inner volume of 10 liters and having two sigma type blades, and nitrogen gas was fed for 30 minutes while keeping the temperature of the reaction system at 25° C., thereby conducting deaeration.

24.6 g of a 15% by weight aqueous solution of sodium persulfate and 15.4 g of a 0.2% by weight aqueous solution of L-ascorbic acid were added while stirring the reaction mixture. As a result, 20 seconds later, polymerization started, and 10 minutes later, the reaction system reached a peak temperature. Thirty minutes after the start of the polymerization, a water-containing gel state polymer was taken out. In the resulting water-containing gel polymer, the particles were divided into a size of not more than 5 mm. The water-containing gel state polymer was spread on a screen having a mesh size of 300 μm and subjected to hot air drying at 170° C. for 60 minutes. The dried material was pulverized by a roll mill and classified by tandem screens of JIS 850 μm and 197 μm, thereby obtaining a fraction on the 197-μm screen. The resulting irregularly-shaped pulverized water-absorbing resin powder had a water absorption magnification (CRC) against a physiological salt solution of 36 g/g.

PREPARATION EXAMPLE 2

Preparation of Irregularly-shaped Pulverized Water-absorbing Resin 2:

To an aqueous solution consisting of 507.9 g of acrylic acid, 5,374.9 g of a 37% by weight aqueous solution of sodium acrylate, 4.1 g of polyethylene glycol diacrylate having 8 ethylene glycol repeating units as an internal crosslinking agent, and 647 g of water, 22.6 g of a 15% by weight aqueous solution of sodium persulfate and 14.1 g of a 0.2% by weight aqueous solution of L-ascorbic acid were added. Thereafter, polymerization, drying, and pulverization were carried out in the same manner as in Preparation Example 1. Further, the pulverized product was classified by tandem screens of JIS 850 μm and 197 μm, thereby obtaining a fraction on the 197-μm screen. The resulting amorphous pulverized water-absorbing resin powder had a water absorption magnification (CRC) against a physiological salt solution of 48 g/g.

REFERENTIAL EXAMPLE 1

The irregularly-shaped pulverized water-absorbing resin 1 obtained in Preparation Example 1 was continuously fed at a rate of 60 g/min into a high-speed mixing machine, and an aqueous solution consisting of 0.32 parts by weight of 1,4-butanediol, 0.5 parts by weight of propylene glycol, and 2.73 parts by weight of water based on 100 parts by weight of the water-absorbing resin (this aqueous solution will be hereinafter referred to as "surface treating agent") was sprayed and added in the high-speed mixing machine. Further, the water-absorbing resin having the surface treating agent sprayed thereon and added thereto was continuously fed into a paddle type low-speed stirring type indirect heat dryer (CD Dryer CD-80 Model, manufactured by Kurimoto, Ltd.; hereinafter referred to as "heat treatment machine") having a total inner volume of 4.6 liters, the height of an outlet weir of which was adjusted such that the average retention time became about 40 minutes. The temperature of a heat medium was 210° C.

The water-absorbing resin of which surface had been crosslinked upon heating was further continuously fed into a similar device connected in series, the height of an outlet weir of which was adjusted such that the average retention time became about 30 minutes, and stirred and cooled. The temperature of the water-absorbing resin was 205° C. at the time of feed and 60° C. at the time of discharge, respectively. The temperature of a coolant to be used was 40° C. (In the case where the coolant was flown in place of the heat medium, the device will be hereinafter referred to as "cooling machine".)

The inside of the cooling machine was made in vacuo at 100 mm $H_2O$ while slightly passing a suction air flow in an upper space of the cooling machine.

The resulting surface crosslinked water-absorbing resin had a water absorption magnification under non-pressure (CRC) of 28 g/g and a water absorption magnification under pressure (AAP) of 24 g/g, respectively.

The amount of fine powders of not larger than 150 μm in the water-absorbing resin 1 was 1.9% by weight at the time of start of the test, whereas it increased to 2.4% by weight after the test. The resulting water-absorbing resin was a water-absorbing resin having poor handling property such that not only breakage of the particles occurred, but also the amount of fine powders increased, thereby likely generating powder dusts.

EXAMPLE 1

The water-absorbing resin 1 was continuously fed at a rate of 60 g/min into a paddle type low-speed stirring type indirect heat dryer (CD Dryer CD-80 Model, manufactured by Kurimoto, Ltd.) having a total inner volume of 4.6 liters, as connected in series, while spraying and adding the surface treating agent aqueous solution in the same manner as in Referential Example 1. The heat medium temperature of the heat treatment machine was 212° C., and the coolant temperature of the cooling machine was 40° C.

The temperature at a position of one-third of the total length of the cooling machine from the outlet side was measured and found to be 65° C. Thus, water was sprayed and added from the head at that position under a condition of a water feed rate of 0.6 g/min and an air pressure of 0.02 MPa using a two-fluid nozzle manufactured by Spraying System Co., Japan (Air Atomizing Nozzle SUFI, flat pattern). The water-absorbing resin to which water had been sprayed and added did not cause a lump or the like within the device and was released in the fine-grained state from the outlet. The discharged water-absorbing resin had a temperature of 60° C. Adhesion of the water-absorbing resin within the device was not observed. The amount of fine powders of 150 μm or smaller in the resulting water-absorbing resin was 1.6% by weight, and breakage of the particles was suppressed as compared with that in Referential Example 1. Further, the amount of fine powders of 150 μm or smaller was reduced by 33% on the basis of the results of Referential Example 1 (2.4% by weight). Further, the generation of powder dust was a little. Although the resulting water-absorbing resin exhibited substantially the same performance, its water absorption magnification under pressure (AAP) increased to 25 g/g.

EXAMPLE 2

The same procedures as in Example 1 were followed, except that the water feed rate was changed to 1.8 g/min. The water-absorbing resin to which water had been sprayed and added did not cause a lump or the like within the device and was released in the free-flowing state from the outlet. The discharged water-absorbing resin had a temperature of 58° C. Adhesion of the water-absorbing resin within the device was not observed. The amount of fine powders of not larger than 150 μm in the resulting water-absorbing resin was 1.2% by weight, and breakage of the particles was suppressed as compared with that in Referential Example 1. Further, the amount of fine powders of not larger than 150 μm was reduced by 50% on the basis of the results of Referential Example 1 (2.4% by weight). Further, the generation of powder dust was a little.

EXAMPLE 3

The same procedures as in Example 1 were followed, except that the water feed rate was changed to 3 g/min. The water-absorbing resin to which water had been sprayed and added did not cause a lump or the like within the device and was released in the free-flowing state from the outlet. The discharged water-absorbing resin had a temperature of 55° C. Adhesion of the water-absorbing resin within the device was observed. The amount of fine powders of not larger than 150 μm in the resulting water-absorbing resin was 1.0% by weight, and breakage of the particles was suppressed as compared with that in Referential Example 1. Further, the amount of fine powders of not larger than 150 μm was reduced by 58% on the basis of the results of Referential Example 1 (2.4% by weight). Further, the generation of powder dust was a little.

EXAMPLE 4

Since in Example 3, adhesion of the water-absorbing resin within the device was observed, the water to be sprayed and added was changed to an aqueous solution containing 1% by weight of polyethylene glycol having an average molecular weight of about 400. By adding polyethylene glycol, not only adhesion of the water-absorbing resin within the device was reduced, but also the adhered water-absorbing resin was easily separated from the inner surface of the device.

The resulting water-absorbing resin did not cause a lump or the like within the device and was released in the free-flowing state from the outlet.

The amount of fine powders of 150 μm or smaller in the resulting water-absorbing resin was 1.2% by weight. Further, the amount of fine powders of 150 μm or smaller was reduced by 50% on the basis of the results of Referential Example 1 (2.4% by weight).

EXAMPLE 5

The same procedures as in Example 4 were followed, except that the aqueous solution was changed to an aqueous solution containing 3% by weight of polyethylene glycol. Adhesion of the water-absorbing resin within the device was similarly reduced. The amount of fine powders of 150 μm or smaller in the resulting water-absorbing resin was 1% by weight. Further, the amount of fine powders of not larger than 150 μm was reduced by 58% on the basis of the results of Referential Example 1 (2.4% by weight).

REFERENTIAL EXAMPLE 2

The same procedures as in Referential Example 1 were followed, except for using the water-absorbing resin 2 and an aqueous solution consisting of 0.024 parts by weight of ethylene glycol diglycidyl ether, 0.32 parts by weight of 1,4-butanediol, 0.5 parts by weight of propylene glycol, and 2.73 parts by weight of water based on 100 parts by weight of the water-absorbing resin as a surface treating agent and changing the heat medium temperature and the coolant temperature to 210° C. and 38° C., respectively. The discharged water-absorbing resin had a temperature of 60° C. The resulting surface crosslinked water-absorbing resin had a water absorption magnification under non-pressure of 35 g/g and a water absorption magnification under pressure (4.9 kPa) of 24 g/g, respectively.

The amount of fine powders of not larger than 150 μm in the water-absorbing resin 2 was 2.0% by weight at the time of start of the test, whereas it increased to 4.2% by weight after the test. The resulting water-absorbing resin was a water-absorbing resin having poor handling property such that not only breakage of the particles occurred, but also the amount of fine powders increased, thereby likely generating powder dusts.

EXAMPLE 6

In Referential Example 2, water was fed at a feed rate of 1.8 g/min in the same manner as in Example 1.

The resulting water-absorbing resin did not cause a lump or the like within the device and was released in the free-flowing state from the outlet. Adhesion of the water-absorbing resin within the device was not substantially observed. The amount of fine powders of 150 μm or smaller in the resulting water-absorbing resin was 3.2% by weight. Further, the amount of fine powders of 150 μm or smaller was reduced by 23% on the basis of the results of Referential Example 2 (4.2% by weight). Although the water-absorbing resin exhibited substantially the same performance, its water absorption magnification under pressure (AAP) increased to 24.5 g/g.

EXAMPLE 7

The same procedures as in Example 6 were followed, except that the water feed rate was changed to 3 g/min. The resulting water-absorbing resin did not cause a lump or the like within the device and was released in the free-flowing state from the outlet. Adhesion of the water-absorbing resin within the device was observed. The amount of fine powders of 150 μm or smaller in the resulting water-absorbing resin was 3.1% by weight. Further, the amount of fine powders of 150 μm or smaller was reduced by 26% on the basis of the results of Referential Example 2 (4.2% by weight). Further, the generation of powder dust was a little.

EXAMPLE 8

Since in Example 7, adhesion of the water-absorbing resin within the device was observed, the water to be sprayed and added was changed to an aqueous solution containing 1% by weight of polyethylene glycol having an average molecular weight of about 400. By adding polyethylene glycol, not only adhesion of the water-absorbing resin within the device was reduced, but also the adhered water-absorbing resin was easily separated from the inner surface of the device. The resulting water-absorbing resin did not cause a lump or the like within the device and was released in the free-flowing state from the outlet.

The amount of fine powders of 150 μm or smaller in the resulting water-absorbing resin was 2.7% by weight. Further, the amount of fine powders of 150 μm or smaller was reduced by 36% on the basis of the results of Referential Example 2 (4.2% by weight).

EXAMPLE 9

Incorporation of Chelating Agent:

The same procedures as in Example 6 were followed, except for changing the aqueous solution to an aqueous solution containing 0.53% by weight of a 45% by weight aqueous solution of sodium diethylenetriaminetetraacetate and changing the feed rate of the aqueous solution to 1.5 g/min. The resulting water-absorbing resin did not cause a lump or the like within the device and was released in the free-flowing state from the outlet. Adhesion of the water-absorbing resin within the device was not substantially observed. The urine resistance of the resulting water-absorbing resin was judged according to the following method.

To 50 g of a physiological salt solution containing 0.05% by weight of L-ascorbic acid, 1.0 g of the water-absorbing resin was added and uniformly swollen. Thereafter, the swollen water-absorbing resin was allowed to stand in a thermostat at 40° C. for 3 hours, and the state of the swollen gel after standing was visually observed. As a result, the water-absorbing resin having sodium diethylenetriaminepentaacetate added thereto kept the state of the swollen gel. On the other hand, in the water-absorbing resin to which no sodium diethylenetriaminepentaacetate had been added (not described in the Examples), the shape of the swollen gel collapsed and became thick. Accordingly, an effect by the addition of sodium diethylenetriaminepentaacetate to the aqueous solution to be sprayed distinctly revealed.

EXAMPLE 10

Incorporation of Deodorant:

The same procedures as in Example 6 were followed, except for changing the aqueous solution to an aqueous solution containing 0.5% by weight of a 15% aqueous solution of a tea leaf extract (NI-Fresca 800MO, manufactured by Shiraimatsu Pharmaceutical Co., Ltd.) and changing the feed rate of the aqueous solution to 1.5 g/min. The temperature of the water-absorbing resin at the time of feed to the cooling machine was 205° C. The resulting water-absorbing resin did not cause a lump or the like within the device and was released in the free-flowing state from the outlet. Adhesion of the water-absorbing resin within the device was not substantially observed. The deodorant performance of the resulting water-absorbing resin was judged according to the following method.

Two grams of the water-absorbing resin was added to 50 g of human urine and uniformly swollen. Thereafter, the swollen water-absorbing resin was allowed to stand in a thermostat at 40° C. for 8 hours, and the odor after standing was scented. As a result, the odor of the human urine-swollen water-absorbing resin to which the tea leaf extract had been added was largely reduced as compared with that of the human urine-swollen water-absorbing resin to which no tea leaf extract had been added.

REFERENTIAL EXAMPLE 3

Position of Water Addition: 30° C.

In the Example 7, the temperature of the coolant was changed to 10° C., and water was added at the position where the temperature within the machine was 30° C.

The discharged water-absorbing resin had a temperature of 25° C.

When the addition of water was continued, the water-absorbing resin having water added thereto became lump and bulky, and finally clogged the outlet of the cooling machine. Because of occurrence of clogging of the outlet, the water-absorbing resin having water added thereto was not discharged, whereby continuation of the operation became impossible.

REFERENTIAL EXAMPLE 4

Position of Water Addition: 110° C.

In the Example 7, water was added at the position where the temperature within the machine was 110° C. The water-absorbing resin to which water had been sprayed and added did not cause a lump within the device and was released in the free-flowing state from the outlet. However, the added water was not effectively absorbed on the water resin but vaporized, thereby causing vigorous condensation within the machine. Dusts flying within the machine adhered to the condensed water and grew with a lapse of time. As a result, the grown dusts sometimes dropped and were discharged as large blocks, thereby clogging the outlet.

The amount of fine powders of 150 μm or smaller in the resulting water-absorbing resin was 2.0% by weight and was not reduced.

What is claimed is:

1. A surface crosslinking treatment method of a water-absorbing resin powder comprising the steps of adding a surface crosslinking agent to a water-absorbing resin powder to form a mixture of the crosslinking agent and the powder;

heat treating the mixture; and, after the heat treatment, stirring the water-absorbing resin powder mechanically or by controlled forced vibration generated by a mechanical vibrator and cooling it under a forced air flow.

2. A surface crosslinking treatment method of a water-absorbing resin powder comprising the steps of adding a surface crosslinking agent to a water-absorbing resin powder to form a mixture of the crosslinking agent and the powder; heating the mixture; and, after the heat treatment, cooling the water-absorbing resin powder under a forced air flow with mechanical stirring or stirring by controlled forced vibration generated by a mechanical vibrator, and at the same time, removing at least a part of fine particles of the water-absorbing resin powder and/or the residual crosslinking agent with the forced air flow.

3. The surface crosslinking treatment method of a water-absorbing resin powder as claimed in claim 1 or claim 2, wherein the air flow is generated under a reduced pressure.

4. The surface crosslinking treatment method of a water-absorbing resin powder as claimed in claim 1, wherein the water-absorbing resin powder is agglomerated after the heat treatment during the cooling step.

5. The surface crosslinking treatment method of a water-absorbing resin powder as claimed in any one of claims 1, 2 and 4, wherein at least one of the heat treatment and the cooling treatment is carried out with a machine having a downward inclination.

6. A surface crosslinking treatment method of a water-absorbing resin powder comprising the steps of adding a surface crosslinking agent to a water-absorbing resin powder to form a mixture of the crosslinking agent and the powder; heat treating the mixture; and, after the heat treatment, stirring the water-absorbing resin powder mechanically or by vibration and cooling it under a forced air flow, wherein an aqueous solution is added to the water-absorbing resin powder in the cooling treatment.

7. The surface crosslinking treatment method of a water-absorbing resin powder as claimed in claim 6, wherein the aqueous solution is added to the water-absorbing resin powder showing a piston flow at a temperature of from 40 to 100° C. during the cooling treatment.

8. The surface crosslinking treatment method of a water-absorbing resin powder as claimed in claim 6, wherein the addition of the aqueous solution is carried out using one or two or more of nozzles selected from nozzles having a spray pattern of a single-fluid or two-fluid flat spray, hollow cone or full cone.

9. The surface crosslinking treatment method of a water-absorbing resin powder as claimed in claim 6, wherein the aqueous solution contains at least one member selected from a deodorant, an anti-fungus agent, a colorant, a chelating agent, an inorganic salt, an acid, an alkali and a surfactant.

10. A surface crosslinking treatment method of a water-absorbing resin powder comprising the steps of adding a surface crosslinking agent to a water-absorbing resin powder to form a mixture of the crosslinking agent and the powder; heat treating the mixture; and, after the heat treatment, stirring the water-absorbing resin powder mechanically or by vibration and cooling it under a forced air flow, wherein the cooling treatment is carried out by a low-speed stirring type cooling machine provided with a plurality of paddles, and the water-absorbing resin powder is flowed in a piston flow in the cooling machine.

11. The surface crosslinking treatment method of a water-absorbing resin powder of claim 1, wherein the step of stirring the water-absorbing resin powder mechanically or by vibration and cooling it under a forced air flow comprises stirring the water-absorbing resin powder under a forced air flow while continuously or batchwise cooling the powder in a mixing machine having a forced cooling function.

12. The surface crosslinking treatment method of a water-absorbing resin powder of claim 1, wherein the step of stirring the water-absorbing resin powder mechanically or by vibration and cooling it under a forced air flow is conducted in a stirring device which has a rotation axis and is capable of stirring and cooling.

13. The surface crosslinking treatment method of a water-absorbing resin powder of claim 12, wherein the stirring device which has a rotation axis and is capable of stirring and cooling is a mixing machine capable of ventilating an air flow and having a cooling function.

14. A surface crosslinking treatment method of a water-absorbing resin powder comprising the steps of adding a surface crosslinking agent to a water-absorbing resin powder to form a mixture of the crosslinking agent and the powder; heat treating the mixture; and, after the heat treatment, stirring the water-absorbing resin powder mechanically or by vibration and cooling it under a forced air flow,
wherein the step of stirring the water-absorbing resin powder mechanically or by vibration and cooling it under a forced air flow is conducted in a mixing machine which is a vessel-fixed type cooling machine provided with a rotational stirring blade capable of stirring the water-absorbing resin and which ventilates air flow.

15. The surface crosslinking treatment method of a water-absorbing resin powder of claim 1, wherein the step of stirring the water-absorbing resin powder mechanically or by vibration and cooling it under a forced air flow comprises a stirring operation in which mechanical vibration is imparted to the water-absorbing resin particles, thereby subjecting the particles to three-dimensional movement by vibration.

16. The surface crosslinking treatment method of a water-absorbing resin powder of claim 15, wherein the mechanical vibration is imparted to the water-absorbing resin particles with an eccentric motor or an electromagnet.

17. A surface crosslinking treatment method of a water-absorbing resin powder comprising the steps of adding a surface crosslinking agent to a water-absorbing resin powder to form a mixture of the crosslinking agent and the powder; heating the mixture; and, after the heat treatment, cooling the water-absorbing resin powder under a forced air flow with mechanical stirring or stirring by vibration, and at the same time, removing at least a part of fine particles of the water-absorbing resin powder and/or the residual crosslinking agent with the forced air flow, wherein an aqueous solution is added to the water-absorbing resin powder in the cooling treatment.

18. The surface crosslinking treatment method of a water-absorbing resin powder as claimed in claim 6, wherein the water-absorbing resin powder is agglomerated after the heat treatment during the cooling step.

19. The surface crosslinking treatment method of a water-absorbing resin powder as claimed in claim 17, wherein the water-absorbing resin powder is agglomerated after the heat treatment during the cooling step.

20. The surface crosslinking treatment method of a water-absorbing resin powder as claimed in claim 17, wherein the aqueous solution is added to the water-absorbing resin powder showing a piston flow at a temperature of from 40 to 100° C. during the cooling treatment.

21. The surface crosslinking treatment method of a water-absorbing resin powder as claimed in claim 17, wherein the addition of the aqueous solution is carried out using one or two or more of nozzles selected from nozzles having a spray pattern of a single-fluid or two-fluid flat spray, hollow cone or full cone.

22. The surface crosslinking treatment method of a water-absorbing resin powder as claimed in claim 17, wherein the aqueous solution contains at least one member selected from a deodorant, an anti-fungus agent, a colorant, a chelating agent, an inorganic salt, an acid, an alkali and a surfactant.

23. A surface crosslinking treatment method of a water-absorbing resin powder comprising the steps of adding a surface crosslinking agent to a water-absorbing resin powder to form a mixture of the crosslinking agent and the powder; heating the mixture; and, after the heat treatment, cooling the water-absorbing resin powder under a forced air flow with mechanical stirring or stirring by vibration, and at the same time, removing at least a part of fine particles of the water-absorbing resin powder andlor the residual cros slinking agent with the forced air flow, wherein the cooling treatment is carried out by a low-speed stirring type cooling machine provided with a plurality of paddles, and the water-absorbing resin powder is flowed in a piston flow in the cooling machine.

24. The surface crosslinking treatment method of a water-absorbing resin powder as claimed in claim 10, wherein the water-absorbing resin powder is agglomerated after the heat treatment during the cooling step.

25. The surface crosslinking treatment method of a water-absorbing resin powder as claimed in claim 23, wherein the water-absorbing resin powder is agglomerated after the heat treatment during the cooling step.

* * * * *